(12) United States Patent
Danilov et al.

(10) Patent No.: US 11,294,805 B2
(45) Date of Patent: Apr. 5, 2022

(54) FAST AND SAFE STORAGE SPACE RECLAMATION FOR A DATA STORAGE SYSTEM

(71) Applicant: EMC IP Holding Company LLC, Hopkinton, MA (US)

(72) Inventors: Mikhail Danilov, Saint Petersburg (RU); Daniel Brook, Saint Petersburg (RU)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 194 days.

(21) Appl. No.: 16/381,559

(22) Filed: Apr. 11, 2019

(65) Prior Publication Data
US 2020/0327050 A1 Oct. 15, 2020

(51) Int. Cl.
*G06F 12/02* (2006.01)
*G06F 12/1018* (2016.01)
*G06F 16/901* (2019.01)
*G06F 16/907* (2019.01)
*G06F 3/06* (2006.01)

(52) U.S. Cl.
CPC ........ *G06F 12/0253* (2013.01); *G06F 3/0619* (2013.01); *G06F 3/0652* (2013.01); *G06F 12/1018* (2013.01); *G06F 16/907* (2019.01); *G06F 16/9027* (2019.01); *G06F 3/0688* (2013.01)

(58) Field of Classification Search
CPC ............. G06F 12/0253; G06F 12/0261; G06F 16/1727; G06F 16/1748; G06F 16/1752; G06F 16/182; G06F 16/2237; G06F 16/2255; G06F 16/9014; G06F 12/10108
USPC .................................................. 707/737, 745
See application file for complete search history.

(56) References Cited

U.S. PATENT DOCUMENTS

| | | | |
|---|---|---|---|
| 9,141,539 B2* | 9/2015 | Ahmad | G06F 12/0253 |
| 9,448,927 B1* | 9/2016 | Agarwala | G06F 12/0811 |
| 10,769,126 B1* | 9/2020 | Hagerup | G06F 16/2453 |
| 10,976,949 B1* | 4/2021 | Calhoun, Jr. | G06F 16/71 |
| 2012/0159098 A1* | 6/2012 | Cheung | G06F 12/0261 |
| | | | 711/162 |
| 2014/0046909 A1* | 2/2014 | Patiejunas | G06F 11/1076 |
| | | | 707/687 |

(Continued)

*Primary Examiner* — Dangelino N Gortayo
(74) *Attorney, Agent, or Firm* — Amin, Turocy & Watson, LLP

(57) ABSTRACT

The disclosed technology generally describes efficient garbage collection operations based on chunk filters (e.g., Bloom filters) maintained in association with object table partitions (e.g., trees). When an object update impacts a chunk, a corresponding chunk filter is updated, using the chunk's identifier as a chunk filter key by hashing the chunk identifier into chunk filter locations and setting bits at those locations. When garbage collection occurs, a garbage collection candidate chunk's identifier is similarly hashed to read the bit values at those locations in the chunk filters for the partitions. If any bit is zero, the chunk is definitely not in use in a partition; if no chunk filter for any partition indicates the candidate chunk is possibly in use, the chunk is garbage collected without tree scanning. If tree scanning is needed, only the partition(s) with an associated chunk filter that indicates "possibly in use" need to be scanned.

20 Claims, 15 Drawing Sheets

(56) References Cited

U.S. PATENT DOCUMENTS

| | | | |
|---|---|---|---|
| 2015/0052109 A1* | 2/2015 | Word | G06F 16/185 |
| | | | 707/651 |
| 2016/0147806 A1* | 5/2016 | Blanco | G06F 16/2272 |
| | | | 707/745 |
| 2016/0321140 A1* | 11/2016 | Khurange | G06F 11/1448 |
| 2017/0235811 A1* | 8/2017 | McKenna | G06F 16/2255 |
| | | | 707/737 |
| 2017/0262345 A1* | 9/2017 | Wang | G06F 11/2094 |
| 2018/0181338 A1* | 6/2018 | Tamura | G06F 3/0608 |
| 2019/0235778 A1* | 8/2019 | Jin | G06F 3/0608 |

* cited by examiner

FAST AND SAFE STORAGE SPACE RECLAMATION FOR A DATA STORAGE SYSTEM

TECHNICAL FIELD

The subject application generally relates to fast and safe space reclamation (garbage collection) in data storage systems, and related embodiments.

BACKGROUND

Contemporary cloud-based data storage systems, such as ECS (formerly known as ELASTIC CLOUD STORAGE) provided by DELL EMC, can be based on a cluster of nodes that each owns some part of the stored data (and can store redundant data and/or erasure coded data owned by other nodes for data protection purposes) in storage devices. For example, user data can be stored in a repository and the metadata (system metadata and metadata used to locate the user data) associated with the user data stored in search trees owned by a given node. The metadata is thus arranged in trees such as B+ trees (the various data is stored in chunks), and partitioned among the nodes such that each tree is owned by one node that is responsible for managing that tree. Note that a node may own more than one tree.

In general, disk space is partitioned into a set of blocks of fixed size called chunks. The information maintained in the cloud-based data storage system, including the user data and the various metadata, is stored in these chunks. For example, there are different types of chunks, one type per capacity user; user data is stored in repository chunks, while the metadata is stored in directory tables, where each directory table (DT) is a set of key-value search trees.

Chunks of each type can be shared. For instance, one repository chunk may contain segments of several user objects, one tree chunk may contain elements of several trees, and so on. Chunk content is modified in append-only mode; when a chunk becomes sufficiently full, that chunk gets sealed and becomes immutable.

Eventually, due to object deletion and the like, a sealed tree chunk becomes unused, in that no node within the node cluster references a tree element that is part of the unused tree chunk. In such a state, the unused tree chunk can be garbage collected and its space reclaimed. However, reference counting by itself is not deemed sufficiently reliable to ensure that a chunk is truly unused, and thus a chunk that appears to be unused based on reference counting is added to a list of garbage collection candidates to be tested in a process referred to as verification. Verification traverses trees (the object table that tracks the objects in the system, which is a directory table) to detect tree elements that are currently referenced to ensure that no live tree element is stored in a garbage collection candidate chunk, in which case that chunk is removed as a candidate. Candidate chunks that do pass verification are deleted and their capacity is reclaimed.

For a relatively large node cluster, the object table is typically an extremely large data structure that mostly resides on hard drives. With the above verification-based garbage collection technique, verification of garbage collection candidates takes significant resources and time, and only a relatively small number of the potential candidates can be verified in one cycle. As a result, complete garbage collection for a relatively large node cluster after significant deletes can take on the order of months.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
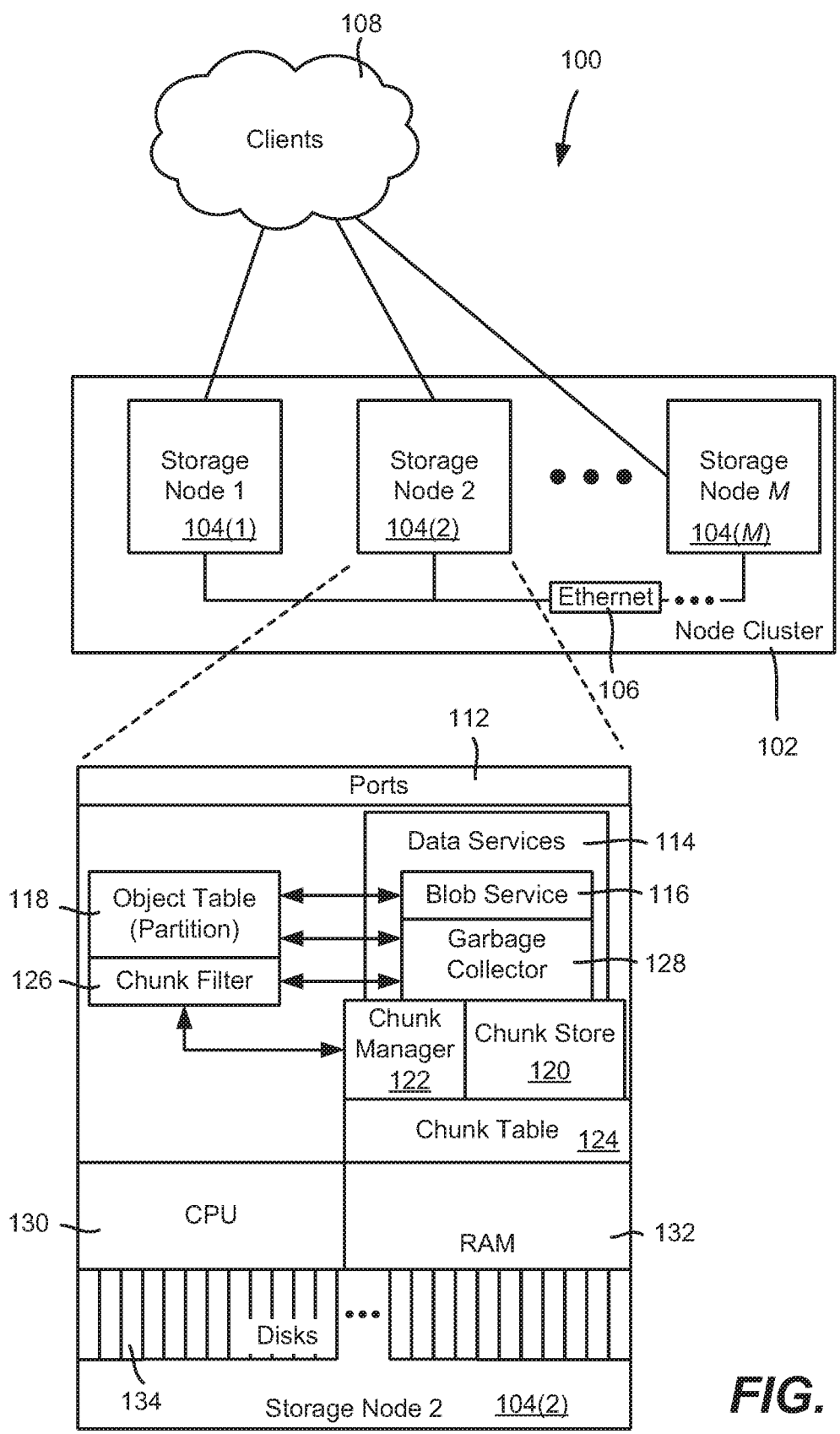
FIG. 1 is an example block diagram representation of part of a data storage system including nodes, in which a chunk filter is used to evaluate garbage collection candidate chunks, in accordance with various aspects and implementations of the subject disclosure.

Various aspects of the technology described herein are generally directed towards fast and safe garbage collection in data storage systems. The technology is based on a relatively very fast and safe verification of a relatively large majority of garbage collection candidate chunks that does not need scanning of the object table. In addition, the technology described herein facilitates much less resource-demanding verification for chunks from the relatively narrow minority of those chunks that are garbage collection candidates but cannot be verified without scanning.

In one aspect, a chunk filter (a type of Bloom filter in one or more implementations) is maintained for each partition of the object table. When an object within a partition stores a segment to a chunk, the corresponding chunk filter for that partition is updated, using a chunk identifier of that chunk as a key to the chunk filter.

At garbage collection time, a garbage collection candidate chunk can be verified against the chunk filters. If the chunk filters report that the candidate chunk is definitely not in use, the candidate chunk is considered as verified, and can be deleted right away and its capacity reclaimed without the resource-demanding and time-consuming scanning of the partitions (trees). Note that with chunk filters (Bloom filters), a chunk is known to be either definitely not in use, or possibly in use (as false positives are possible with such types of filters).

Only when one or more chunk filters report that the garbage collection candidate chunk is possibly in use is scanning needed for the candidate chunk. Note, however that there is no need to scan all the partitions, as only the tree(s) that are associated with the chunk filter(s) that reported "possibly in use" need to be scanned; this further makes the overall verification process significantly less resource-demanding.

As will be understood, the implementation(s) described herein are non-limiting examples, and variations to the technology can be implemented. For instance, many of the examples herein are based on ECS, however the technology is applicable to any data storage system that has units of data that need to be garbage collected. As another example, although the term "chunk" is used herein to represent any data storage unit or data portion, the term "chunk" is not limited to ECS chunks, but rather represents any data storage unit, such as corresponding to the fragment level or the stripe level in other storages systems. As such, any of the embodiments, aspects, concepts, structures, functionalities, implementations and/or examples described herein are non-limiting, and the technology may be used in various ways that provide benefits and advantages in data storage in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows part of a cloud data storage system 100 (such as ECS) comprising a node cluster 102 of storage nodes 104(1)-104(M), in which each node is typically a server configured primarily to serve objects in response to client requests. The nodes 104(1)-104(M) are coupled to each other via a suitable data communications link comprising interfaces and protocols, such as represented in FIG. 1 by Ethernet block 106.

Clients 108 make data system-related requests to the cluster 102, which in general is configured as one large object namespace; there may be on the order of billions of objects maintained in a cluster, for example. To this end, a node such as the node 104(2) (shown enlarged in FIG. 1 as well) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

Each node, such as the node 104(2), includes an instance of a data storage system and data services 114; (note however that at least some data service components can be per-cluster, rather than per-node). For example, ECS™ runs a set of storage services, which together implement storage logic. Services can maintain directory tables for keeping their metadata, which can be implemented as search trees. A blob service 116 maintains an object table 118 (e.g., in various partitions among nodes) that keeps track of objects in the data storage system and generally stores their metadata, including an object's data location information, e.g., within a chunk. There is also a "reverse" directory table (maintained by another service) that keeps a per chunk list of objects that have their data in a particular chunk.

FIG. 1 further represents some additional concepts, in that the user data repository of chunks is maintained in a chunk store 120, managed by another storage service referred to as a chunk manager 122. A chunk table 124 maintains metadata about chunks, e.g., as managed by the chunk manager 122. As described herein, the chunk manager 122 maintains a chunk filter 126 when an object stores a segment to a chunk (although it is alternatively feasible for another entity, such as the blob service 116, to maintain the chunk filter 126).

In one or more implementations, garbage collection is a duty of the chunk manager 122, represented in FIG. 1 as a garbage collector 128 coupled to (or incorporated into) the chunk manager 122, which in turn is coupled to the chunk store 120 and the chunk filter 126, as well as to the blob service 116/object table partition 118 to garbage collect garbage collection candidate chunks that are verified as not containing live data. More particularly, garbage collection is implemented at the chunk level, and operates to only collect empty chunks, that is, those that do not contain live data. In order to facilitate garbage collection, the data storage system uses a version of a reference counting technique, in which the system counts the number of referenced bytes in each chunk. However, as set forth above, reference counting by itself is not sufficiently reliable, and is thus used to obtain the garbage collection candidate chunks. Verification is performed on these garbage collection candidate chunks to determine whether or not a garbage collection candidate chunk does indeed not contain any live data before being garbage collected. As will be understood, the chunk filter 126 described herein facilitates fast and safe verification of (typically) most of the garbage collection candidate chunks, thereby allowing efficient storage space reclamation.

In FIG. 1, a CPU 130 and RAM 132 are shown for completeness; note that the RAM 130 may comprise at least some non-volatile RAM. The node 104(2) further includes storage devices such as disks 134, comprising hard disk drives and/or solid-state drives, or any other suitable type of storage resource. As can be readily appreciated, components of the data storage system including those described herein can be at various times in any storage device or devices, such as in the RAM 132, in the disks 134, or in a combination of both, for example.

Figure 2:
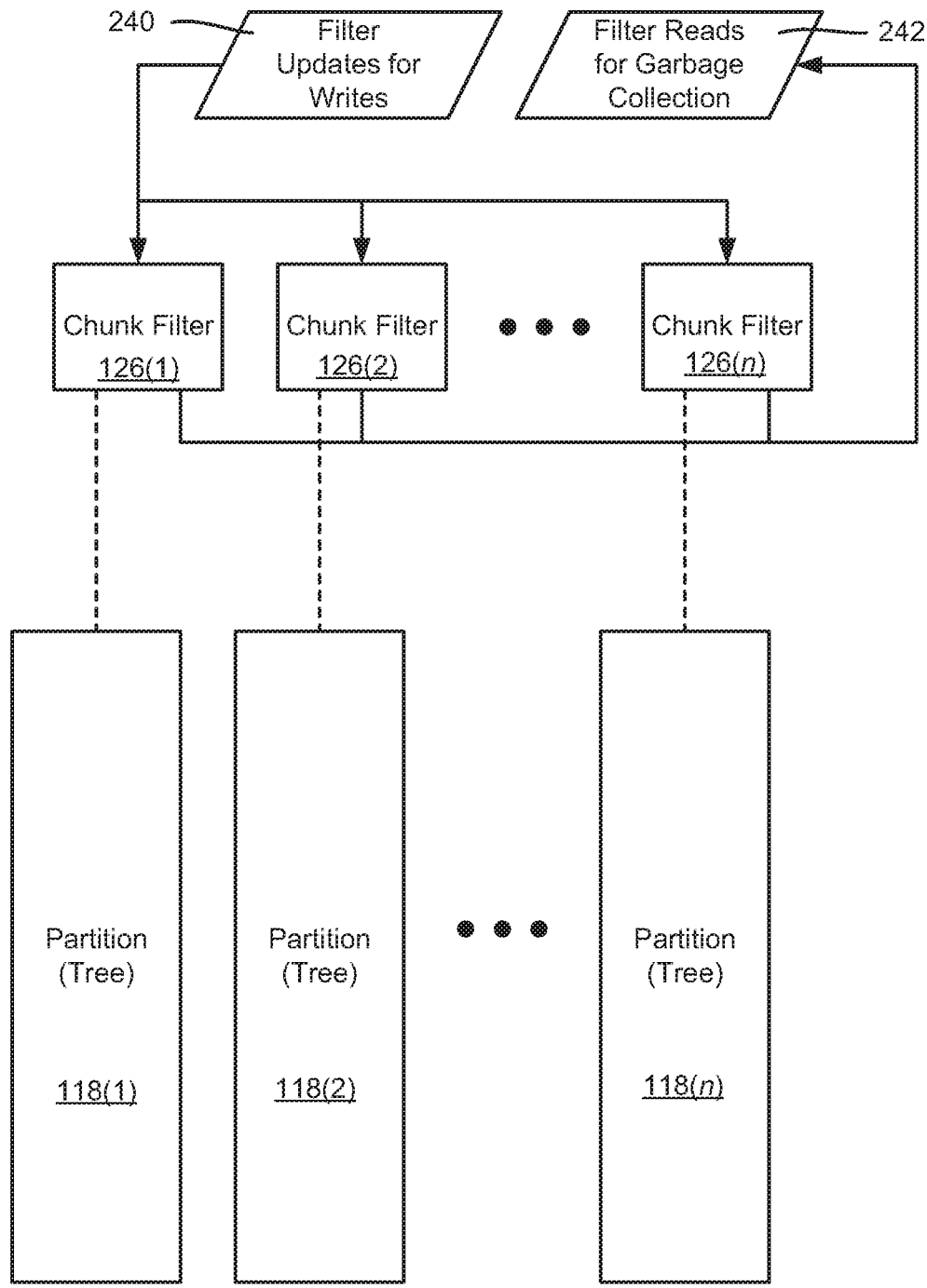
FIG. 2 is an example block diagram representation of partitions (trees) with respective associated chunk filters, in accordance with various aspects and implementations of the subject disclosure.

As represented in FIG. 2, as described herein, the partitions (of the various trees) including the object table partitions 118(1)-118(n) (note that n is 128 in one or more implementations) can be managed across nodes. The object table is a directory table, and in one or more implementations a single directory table may have a plurality of partitions (e.g. 128 partitions). Each partition may be implemented as a search tree (e.g. as a B+ tree). Search trees for a typical system are rather large, and are stored on hard drives, whereby searching in the trees is an expensive operation. An object-related Bloom filter can be maintained for each object table partition/tree to expedite search-related operations, using the object identifier as a key to the object-related Bloom filters.

The technology described herein comprises using chunk filters (other types of Bloom filters in one or more implementations) for fast and safe verification of garbage collection candidates. To this end, respective object table partitions 118(1)-118(n) have respective chunk filters 126(1)-126(n), that is, one chunk filter per partition. In one or more implementations, the chunk filter can comprise a bitmap on the order of millions of bits. Object updates to a chunk maintained in a chunk store, with its metadata maintained in an object table (e.g., the object table 118(1)), result in a chunk filter update 240 to the corresponding chunk filter (e.g., 126(1)) to indicate that the chunk is in use, with the resultant chunk filter update keyed by the chunk identifier of the chunk. When garbage collection occurs, the chunk filters 126(1)-126(n) are read (as represented in FIG. 2 by chunk filter reads 242) to see whether a garbage collection candidate chunk, as referenced by the chunk's chunk identifier, is determined to be not in use, or determined to be possibly in use.

Note that a chunk filter is not for identifiers of objects within a partition, but rather is for repository chunks referenced by objects within a partition, and thus a key for a chunk filter is a chunk identifier. A chunk identifier of a chunk impacted by an object update is added (by hashing to create a key) to a chunk filter when an object within the corresponding partition stores its segment to the chunk.

A Bloom filter is a probabilistic data structure, which is used (as described herein as a chunk filter) during garbage collection to test whether a chunk (based on the chunk identifier being hashed into a key) is a member of a tree. Note that in in one or more implementations, Bloom filters of a type that support deletion of keys are not used, and thus deletion of objects and their updates can cause false positive matches (a chunk may be positive in a chunk filter with respect to previously being in use but no longer in use), but false negatives are not possible (a chunk, looked up in the chunk filters as keyed by its chunk identifier, is definitely not in a tree). Therefore, a Bloom/chunk filter query returns either "possibly in tree" or "definitely not in tree" without any possibility of false negatives.

Figure 3:
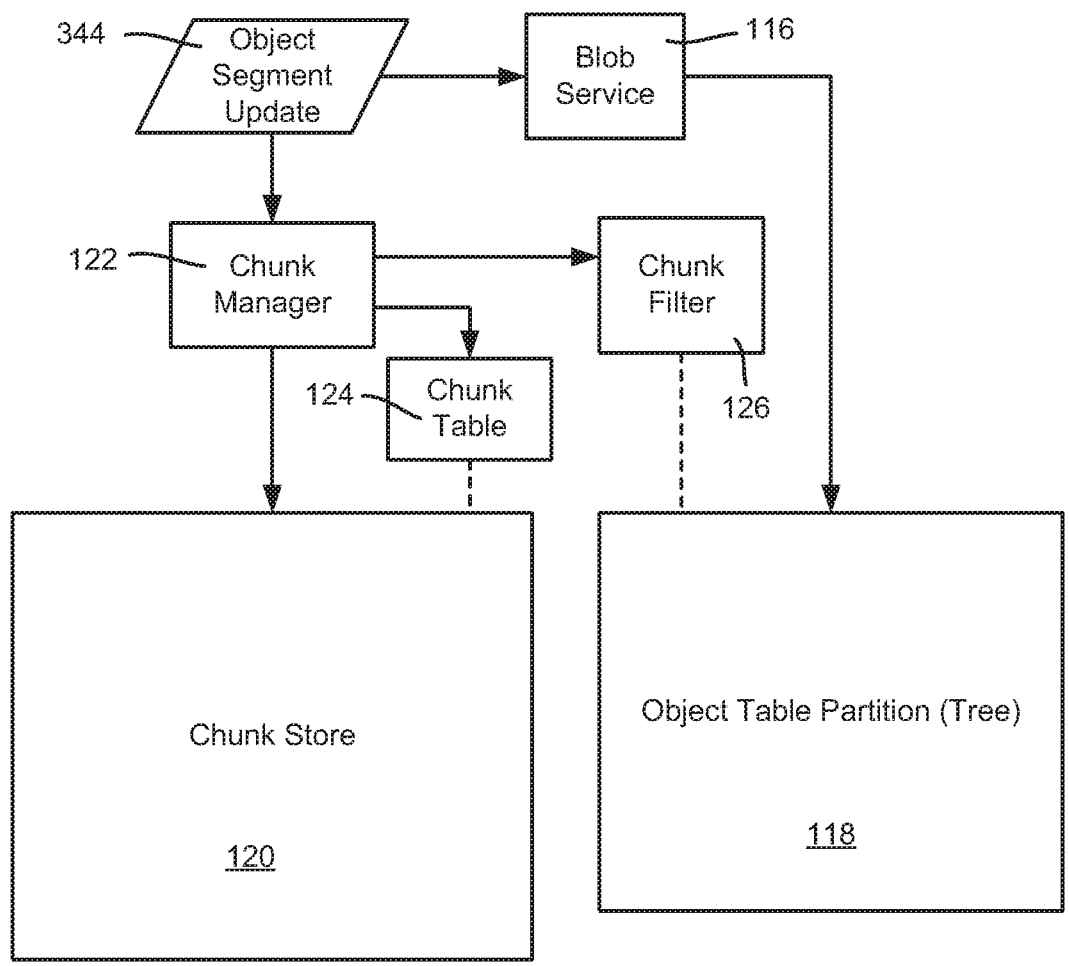
FIG. 3 is an example block diagram representation of handling an object segment update, including with respect to chunk filter, in accordance with various aspects and implementations of the subject disclosure.
Figure 4:
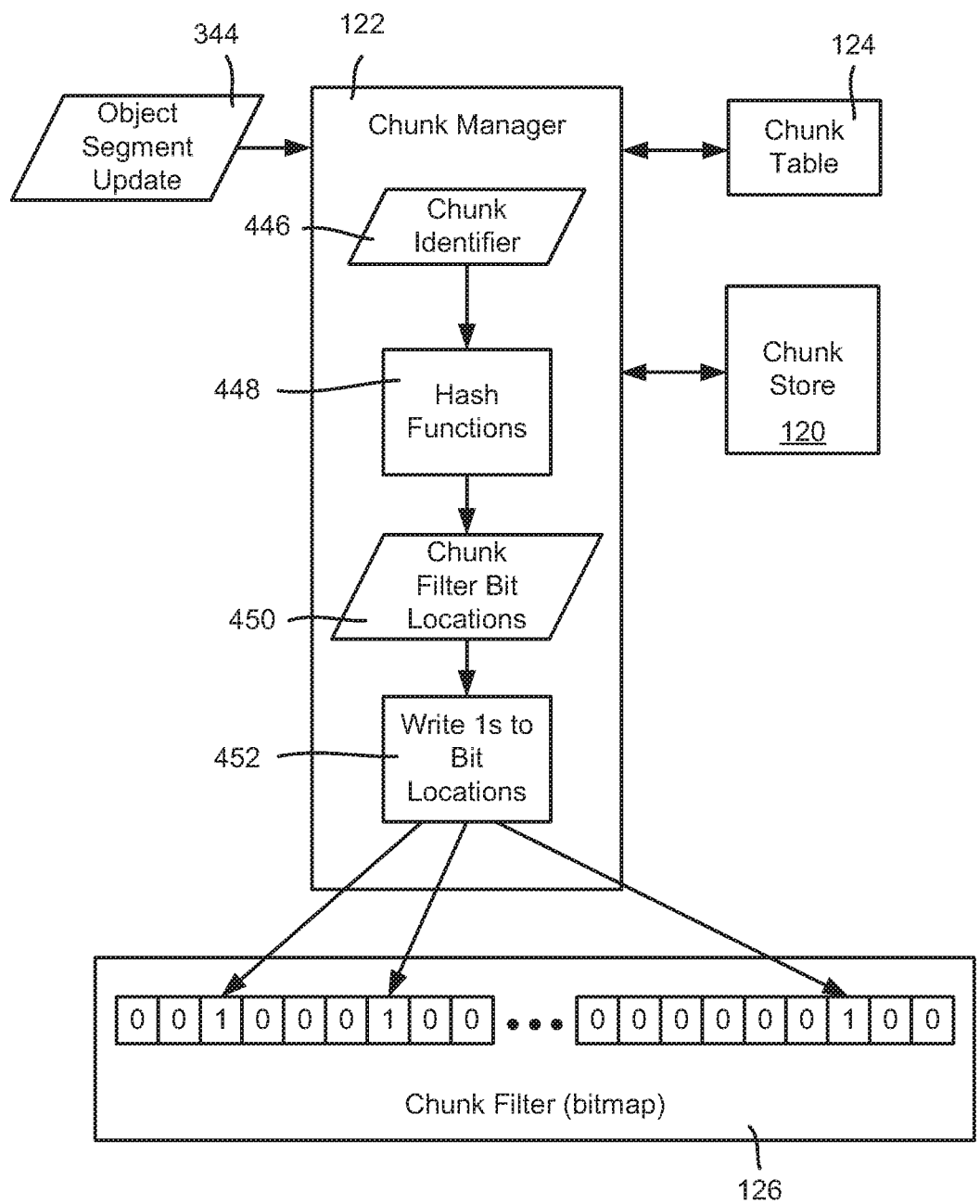
FIG. 4 is an example block diagram representation of updating a chunk filter based on an object segment update, in accordance with various aspects and implementations of the subject disclosure.

The chunk filter is a bit array of m bits initially set to 0, that is, when the tree is empty or a new chunk filter is initialized. To key a chunk identifier, k different hash functions are defined. Each function hashes the chunk identifier into a key to one of the array positions. As represented in FIGS. 3 and 4, when an element is added to the tree, e.g., as a result of the object segment update 344, the chunk identifier 446, as the key, is fed to a set of hash functions 448 to determine k positions in the array (chunk filter 126); the bits at these positions are set to 1 (block 452). Note that the size of the array, m, is on the order of millions of bits, and the number of different hash functions, k, is typically two or three. Note that in addition to writing to the chunk filter 126, other object update-related operations are represented in FIG. 3, e.g., the chunk manager writes to relevant chunk in the chunk store 120 and updates the chunk table 124, the blob service 116 updates the corresponding partition 118 of the object table, and so on.

Figure 5:
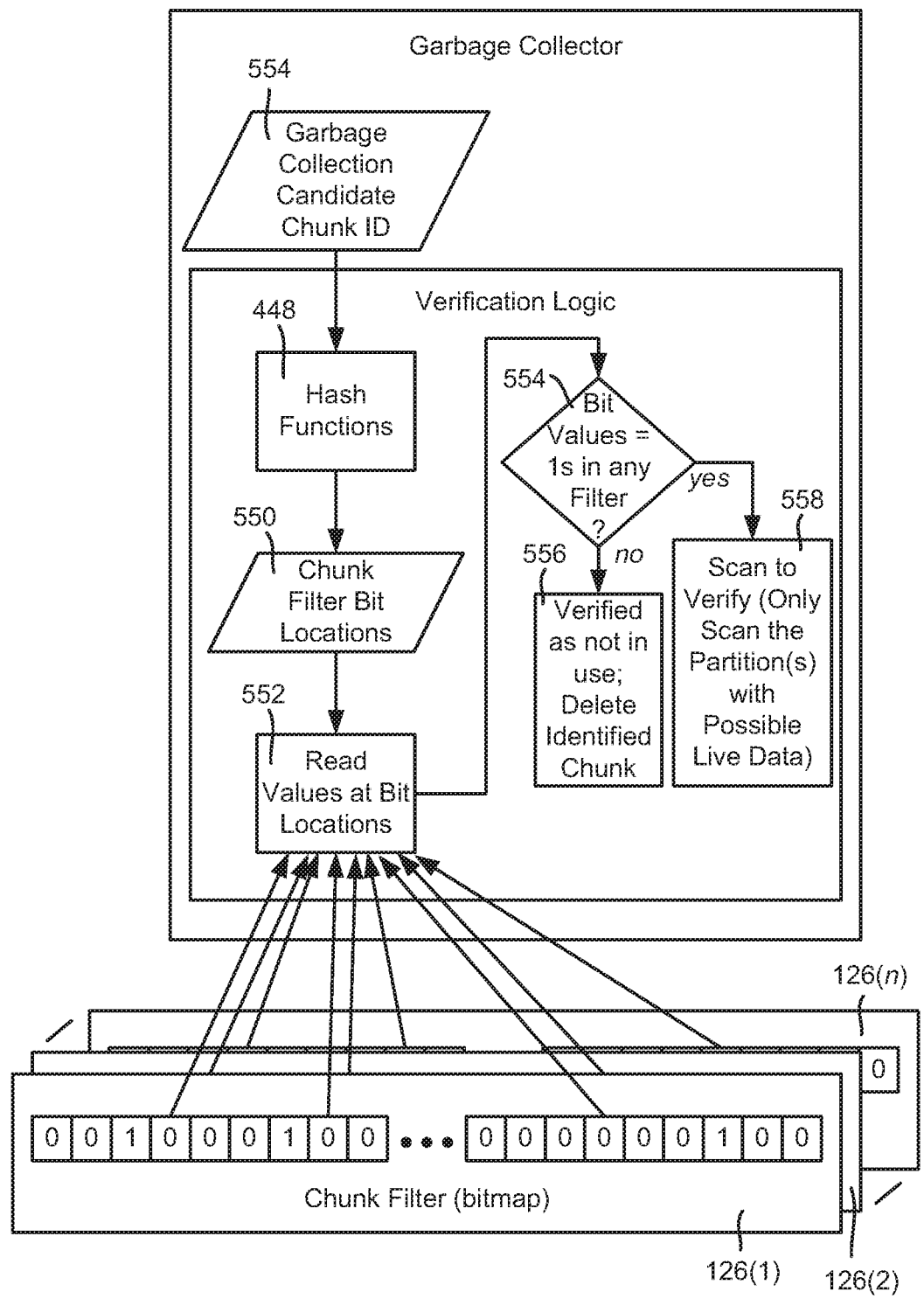
FIG. 5 is an example block diagram representation of reading chunk filters to determine whether a garbage collection candidate can be garbage collected, in accordance with various aspects and implementations of the subject disclosure.

As represented in FIG. 5, a garbage collection candidate chunk can be verified against the chunk filters 126(1)-126(n) (note that n is 128 in one or more implementations). To this end, the chunk identifier 554 of the garbage collection candidate chunk is hashed, using the same set of k hash functions 550, into its key corresponding to chunk filter bit locations 550. The values at these bit locations are read (block 552), and evaluated at block 554. In other words, to test whether an element (the hash identifier) is in the tree, the hash identifier as the key is fed to each of the k hash functions to get k positions in the array. If any of the bits at these positions are 0s, the element is definitely not in the tree. If all the bit values are 1, then either the element is in the tree, or all the bits have been set to 1 during the insertion of other elements, resulting in a false positive.

Figure 6:
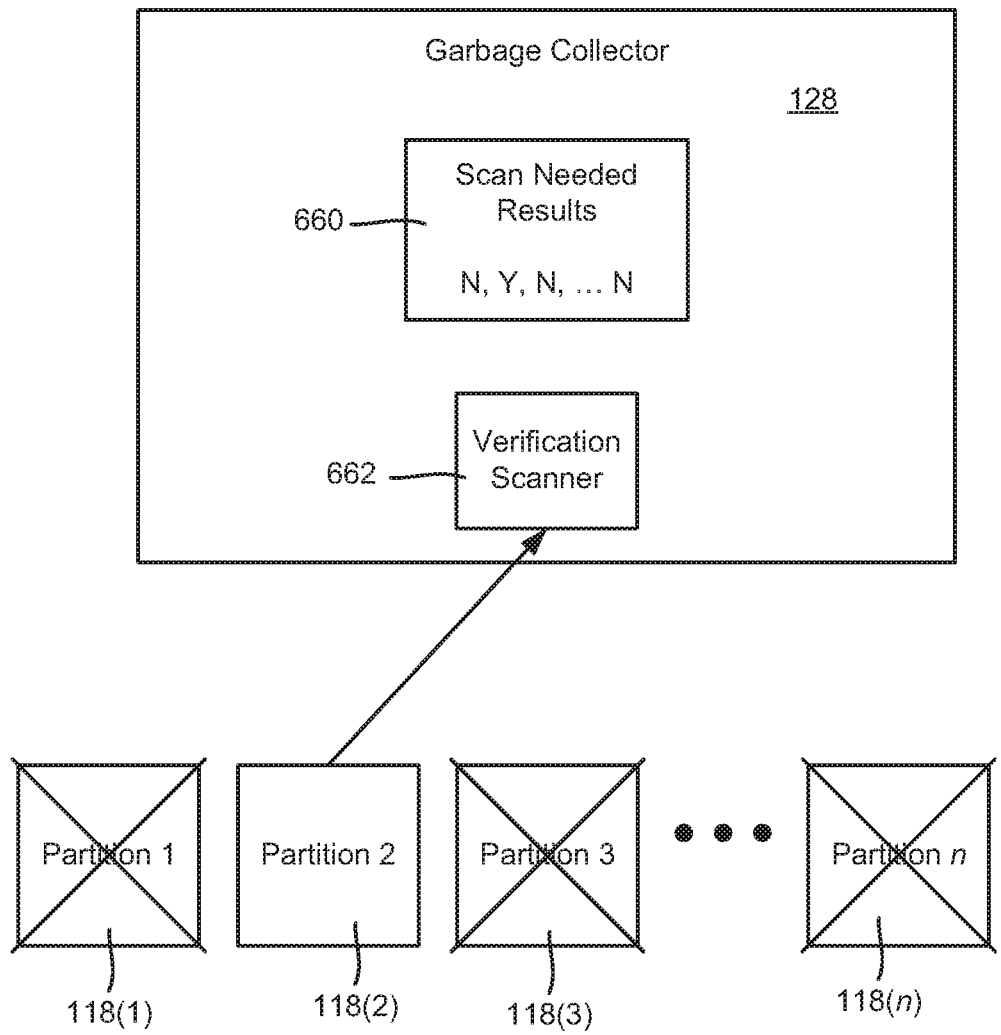
FIG. 6 is an example block diagram representation of using the results of reading chunk filters to perform tree scanning on only partition(s) whose chunk filter(s) indicate a chunk is possibly in use, in accordance with various aspects and implementations of the subject disclosure.

Because any object table can be updated, each of the chunk filters are evaluated. Two evaluation outcomes are possible, namely that all the chunk filters indicate "definitely not in use" as each of the bit values is a zero (0), or one or more chunk filters indicate that the "possibly in use" as all of the bit values are a one (1) in any given filter. In the definitely-not-in-use outcome, the chunk is considered as verified, and can be deleted/its capacity reclaimed, as represented by block 556. Note that in this outcome, the garbage collection candidate chunk is verified without the resource-demanding and time-consuming scanning of all the trees In the second, possibly-in-use outcome, the chunk requires additional verification via trees scanning. Note however that as represented in FIG. 6, only the tree or trees that have an associated chunk filter that indicated "possibly in use" need scanning. In the example of FIG. 6, consider that based on the results 660 of whether a scan is needed, only the partition 2 (labeled 118(2)) needs to be scanned for verification (block 662), (because its associated chunk filter indicated "possibly in use" for the chunk identifier) As is understood, scanning only the trees that indicate "possibly in use" makes any scanning for the verification process significantly less resource-demanding relative to scanning every tree.

It should be noted that the deletion of objects and their updates causes the degradation of chunk filters over time, in that previously used chunks are no longer used, but the chunk filter cannot be safely cleared to 0 at these locations (e.g., a hash collision with another chunk identifier that still needs the bit set to 1 could exist). Thus, the probability of "possibly in use" answers constantly increases over time, which results in more and more garbage collection candidates needing tree scanning for verification.

Described herein is rebuilding a chunk filter from time to time based on scanning the corresponding tree associated with a chunk. Because as described herein such scanning is already part of the slower verification of garbage collection candidates when needed, a chunk filter can be rebuilt when scanning is needed for verification of garbage collection candidate or candidates.

Note that because chunk filters are not used to serve requests from data clients, an older, apparently stale, chunk filter can be deleted before starting the creation of a new version of the chunk filter, which avoids doubling RAM overhead on chunk filters. Verification requests to a chunk filter are handled only after the chunk filter is completely rebuilt. For example, when an older chunk filter reported "possibly in use" for some number of chunks, one tree scanning can be used to produce a new filter and verify the chunks. The use of the chunk filter to verify new chunks waits until the new filter is fully rebuilt. Note that the rebuilding of chunk filters listens to tree updates in order to add newly referenced repository chunks to chunk filters. Chunk filter rebuilding can for example, be based on chunk filter age (e.g., based on statistics as to at what point a chunk filter is likely sufficiently degraded that rebuilding is desirable) and/or some number of chunks needing scanning for verification (e.g., statistically there seems to be too many "possibly in use" results).

Figure 7:
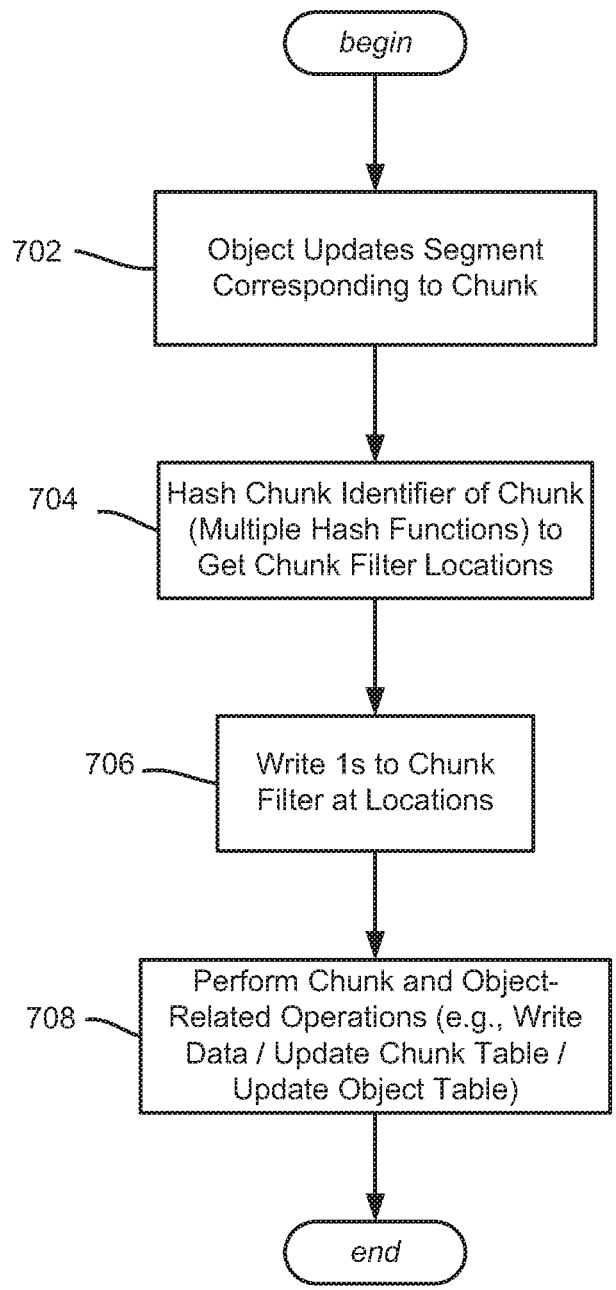
FIG. 7 is a flow diagram showing example operations for maintaining a chunk filter when an object is updated, in accordance with various aspects and implementations of the subject disclosure.

FIG. 7 summarizes example operations related to writing the chunk filter, beginning at operation 702 which represents and object updating a segment corresponding to a chunk. Operation 704 represents hashing the chunk identifier with the k different hash functions to get the chunk filter locations, with operation 706 writing the 1s to these locations. Operation 708 represents performing other chunk and object related operations, such as writing the chunk data and updating the chunk table and object table partition. Note that operations 704, 706 and 708 can be performed transactionally and/or in parallel or partially in parallel.

Figure 8:
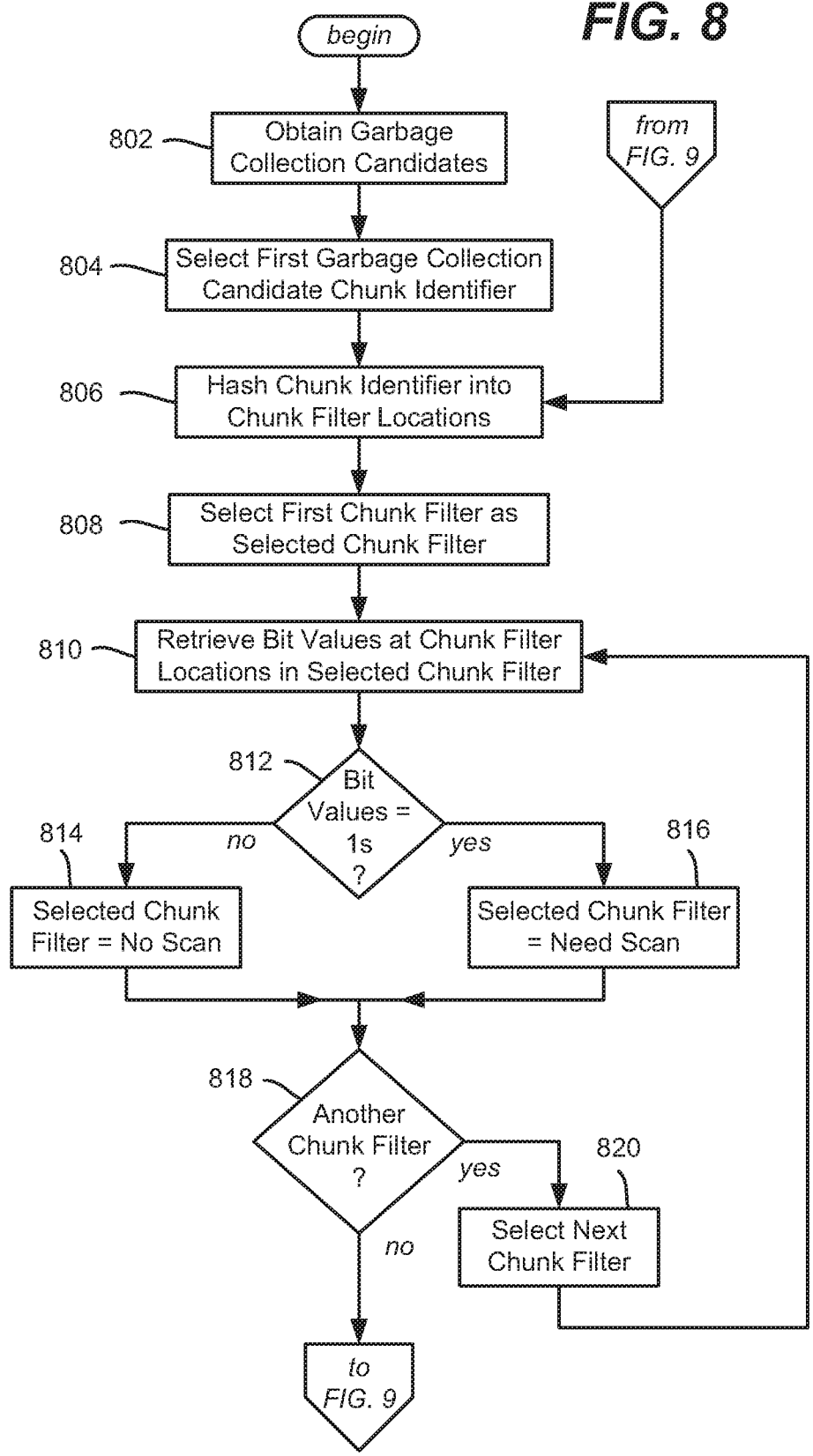
FIGS. 8-10 comprise a flow diagram showing example operations of garbage collecting candidate chunks based on using chunk filters, in accordance with various aspects and implementations of the subject disclosure.
Figure 9:
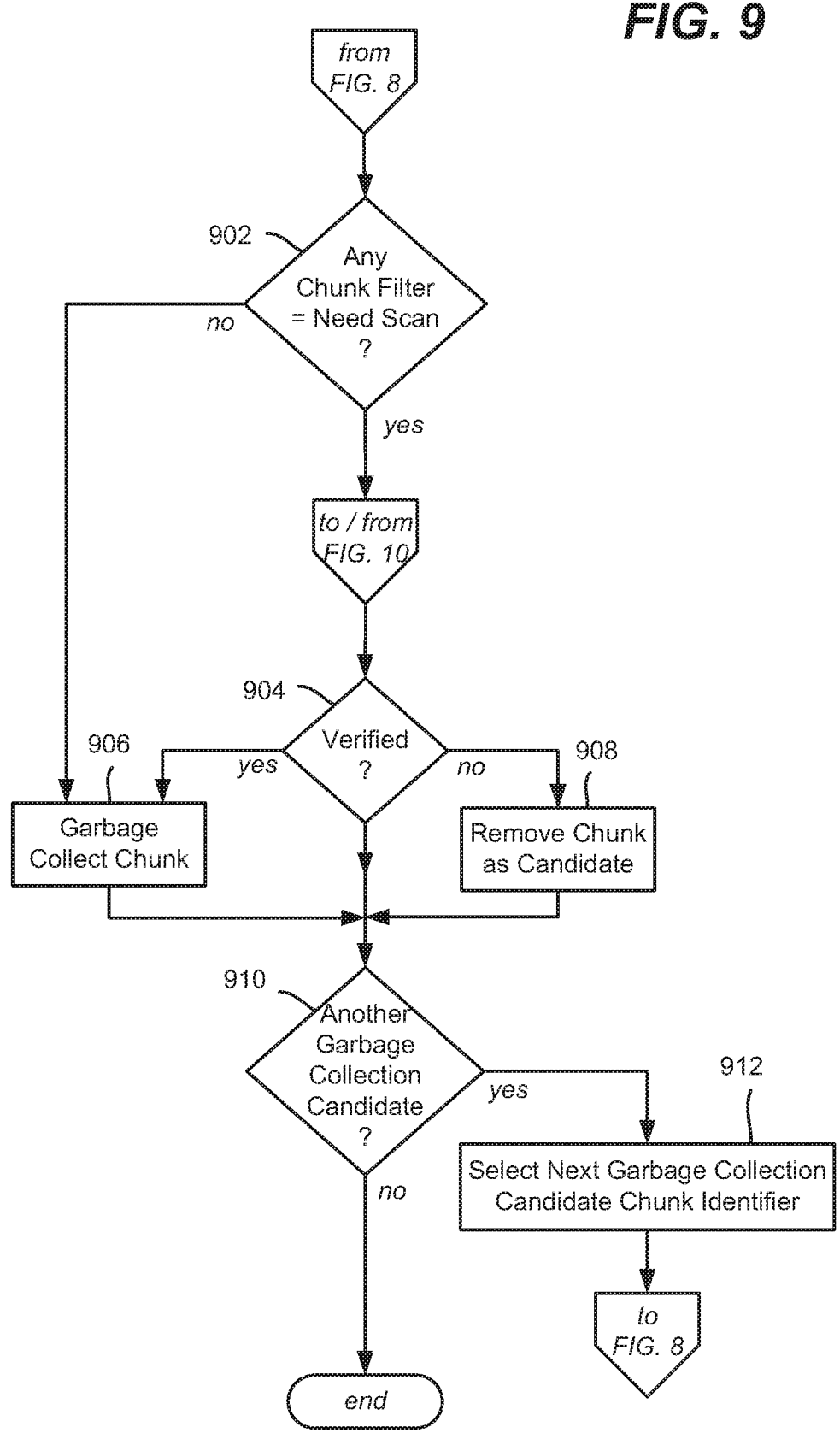
Figure 10:
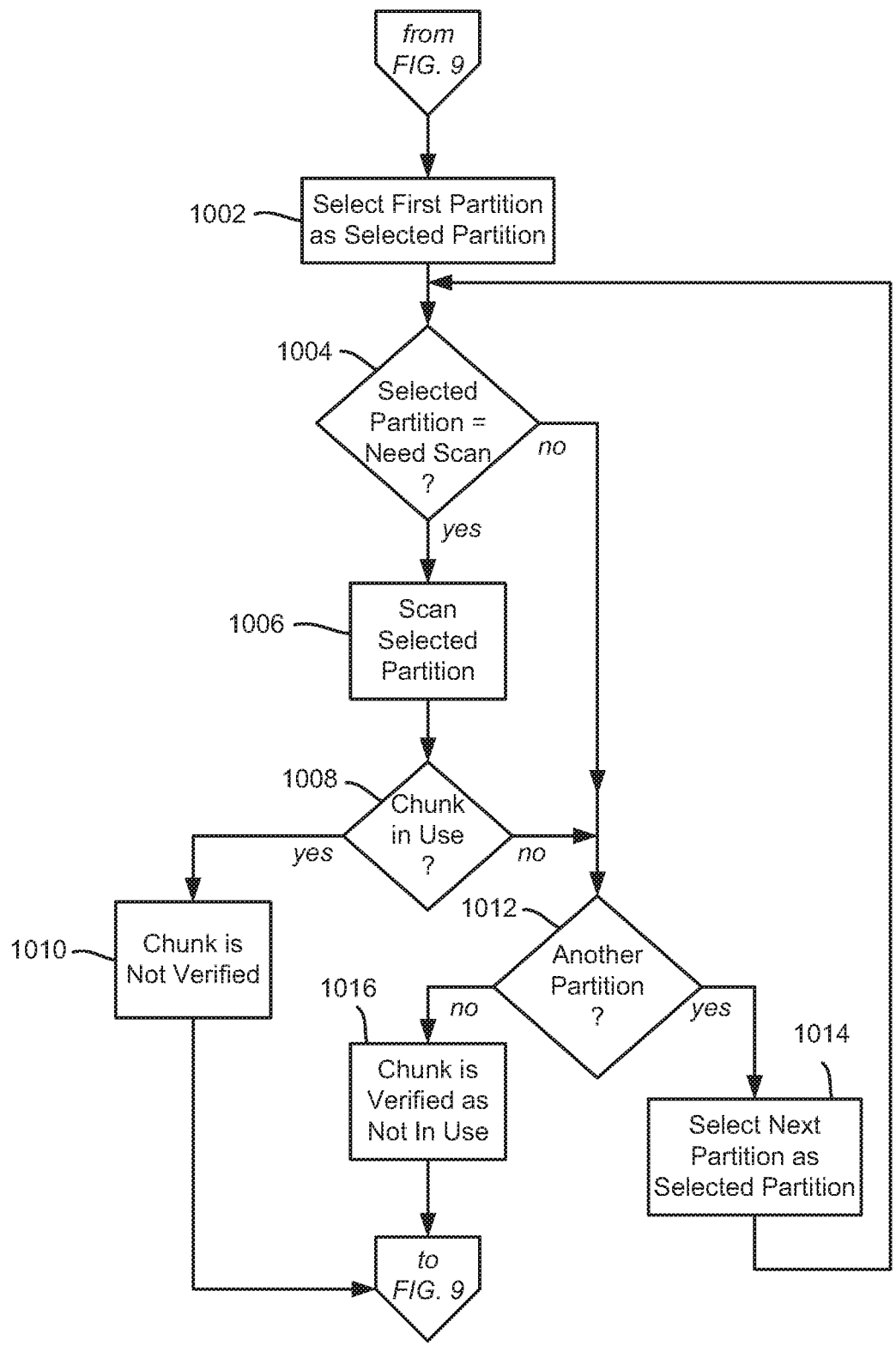

FIGS. 8-10 summarizes example operations related to handling a garbage collection candidate; note that at least some the operations can be performed on multiple garbage collection candidates in parallel, at least to an extent. Operation 802 represents obtaining the garbage collection candidates in some data structure, such as a list of candidates based on reference counting. Operation 804 selects the chunk identifier of a first garbage collection candidate, and operation 806 represents hashing the chunk identifier into the chunk filter locations.

The hash locations of the chunk filters (e.g., the locations at each of the 128 of them) need to be read, which is represented by selecting the first chunk filter at operation 808, and retrieving the bit values at operation 810. Operation 812 evaluates whether the retrieved bit values are 1s. If not, then this chunk filter indicates that no tree scanning needs to be performed on the chunk filter's associated object table partition, and this information is noted at operation 814. Otherwise scanning is needed, because based on the chunk filter indication, the chunk is possibly in use, as represented by operation 816. Operations 818 and 820 repeat the process for the other chunk filters until they have been checked. Note again that more than one chunk filter can be read and evaluated in parallel operations, although not explicitly represented in FIG. 8.

The process continues to FIG. 9, where operation 902 represents evaluating whether any of the chunk filters indicated that a tree scan is needed on its associated object table partition for the selected chunk as keyed by its chunk identifier. If not, then the chunk is verified as not in use, and can be safely garbage collected (operation 906), without any tree scanning operations. Operations 910 and 912 repeat the process for other garbage collection candidates, (which again need not be one at a time as exemplified if parallel operations can be performed to some extent).

Returning to operation 904, if any chunk filter needs a scan, the process instead branches to operation 1002 of FIG. 10. Operation 1002 selects the first partition as a selected partition.

Operation 1004 evaluates whether this selected partition needs to be scanned. If so, operation 1006 scans the partition, and operation 1008 evaluates whether as a result of the scanning, the chunk is in use or is not in use. If in use, the chunk is in use and thus not verified, and operation 1010 returns to operation 904 of FIG. 9, which branches to operation 908 to remove the chunk as a garbage collection candidate. Note that any one partition scan indicates that the chunk is in use "short circuits" the need to scan any other partition. Further note that it is feasible to change (e.g., increment) the reference count for a chunk determined to be in use, so that the chunk does not become a candidate again unless something else such as a delete operation changes (e.g., decrements) the reference count. Operations 910 and 912 repeat the process for other garbage collection candidates until none remain; note that it is feasible to halt garbage collection until some later time before all candidates have been processed for other reasons, such as when resources are needed elsewhere, or after some number of candidates have been processed.

Returning to operation 1004, if the selected partition does not need scanning, operations 1012 and 1014 repeat the scan or no-scan evaluation process for other partitions. When no partitions remain for evaluation, and no partition scan operation has indicated that the chunk is un use, the chunk is verified as not in use at operation 1016, before returning to operation 904 of FIG. 9 which branches to operation 906 to delete the verified chunk.

Figure 11:
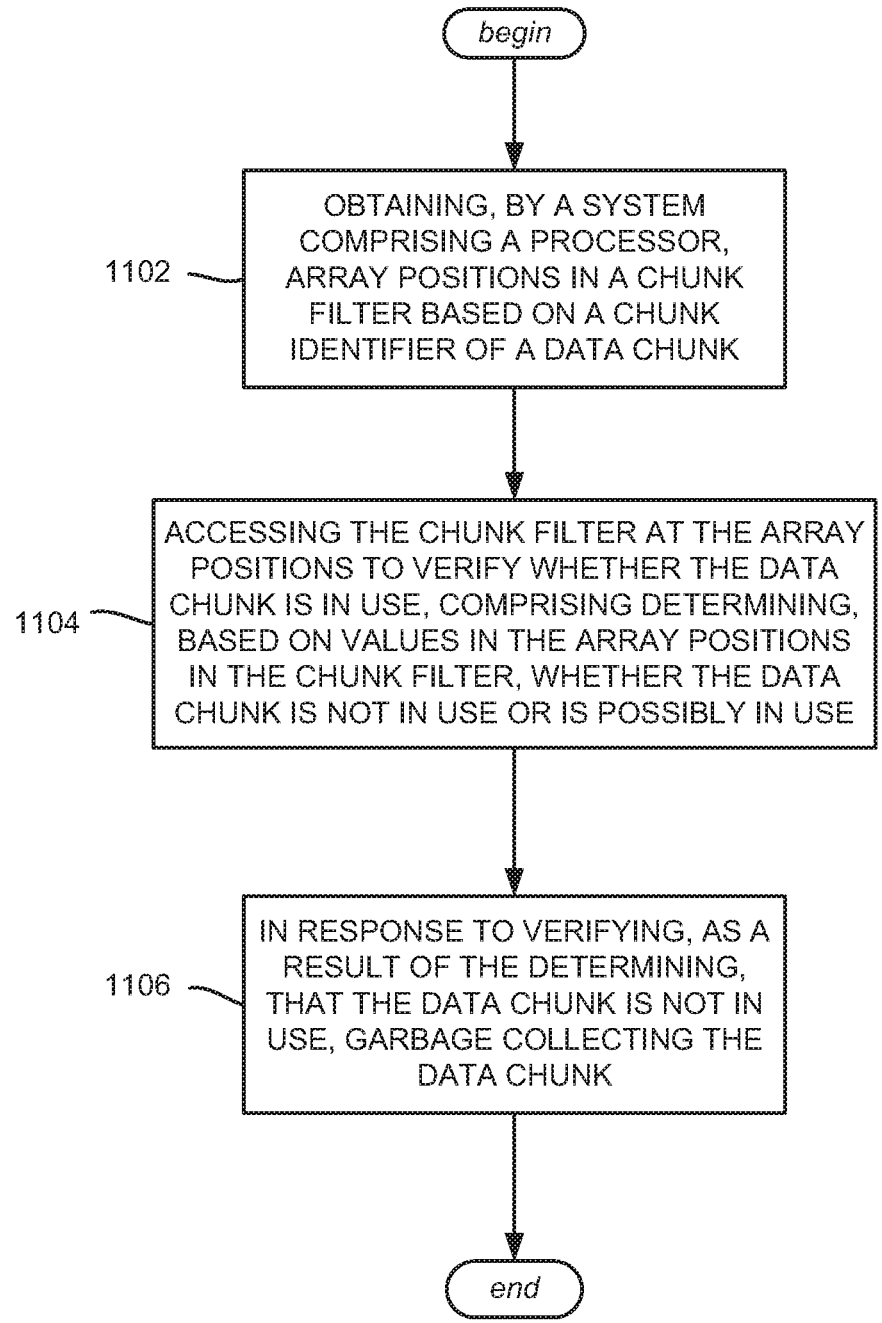
FIG. 11 is a flow diagram representation of example operations related to performing garbage collection of a candidate chunk based on using a chunk filter, in accordance with various aspects and implementations of the subject disclosure.

One or more example aspects are represented in FIG. 11, and can correspond to operations of a method, for example. Example operations comprise operation 1102, which represents obtaining, by a system comprising a processor, array positions in a chunk filter based on a chunk identifier of a data chunk. Operation 1104 represents accessing the chunk filter at the array positions to verify whether the data chunk is in use, comprising determining, based on values in the array positions in the chunk filter, whether the data chunk is not in use or is possibly in use. Operation 1106 represents. in response to verifying, as a result of the determining, that the data chunk is not in use, garbage collecting the data chunk Aspects an comprise maintaining the chunk filter in association with a chunk data structure, comprising determining when an element corresponding to the data chunk is added to the chunk data structure, hashing the chunk identifier of the data chunk to determine the array positions, and storing values at the array positions to indicate that the data chunk is in use.

The chunk filter can comprise a bitmap, and storing the values at the array positions to indicate that the data chunk is in use can comprise setting respective bits at respective array positions.

The chunk filter can be associated with a chunk data structure, and aspects can comprise, in response to determining from the values in the array positions that the chunk is possibly in use, performing a scanning operation on the chunk data structure to determine whether the chunk is in use or is not in use, and, in response to determining that the chunk is not in use, garbage collecting the data chunk.

Aspects can comprise rebuilding the chunk filter into a new chunk filter during the scanning operation.

The chunk identifier can be a first chunk identifier of a first data chunk, the array positions can be first array positions, and rebuilding the chunk filter can comprise detecting a chunk data structure update corresponding to an element corresponding to the second data chunk being added to the chunk data structure, in response to the detecting the chunk data structure update, determining second array positions corresponding to the second chunk identifier, and storing values at the second array positions to indicate that the second data chunk is in use.

Obtaining the array positions can comprise using a group of respective hash functions that hash the chunk identifier into respective array positions.

The chunk filter can comprise a Bloom filter data structure comprising a corresponding bitmap data structure; obtaining the array positions can comprise using a group of respective hash functions that hash the chunk identifier into respective array positions in the corresponding bitmap data structure.

Figure 12:
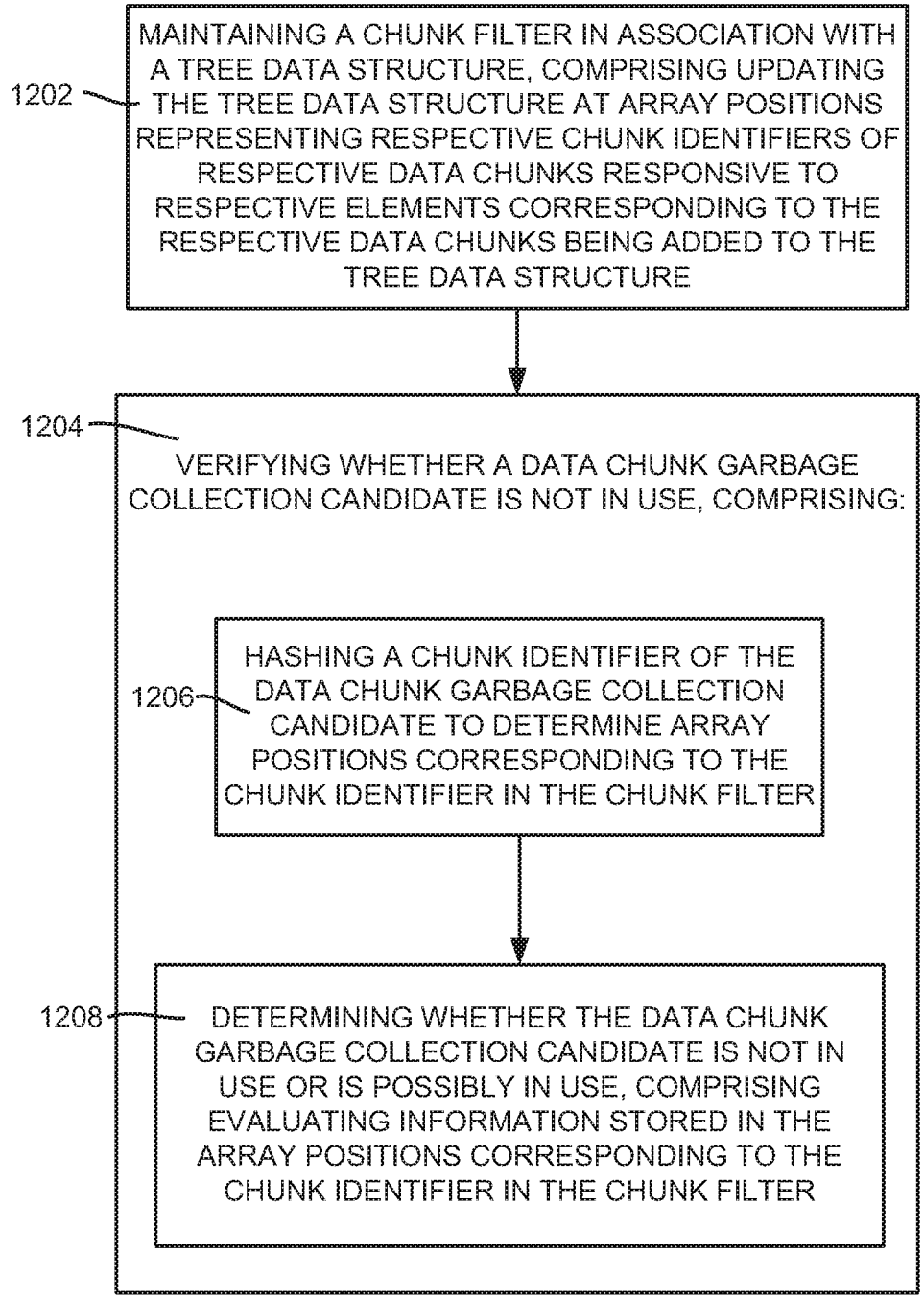
FIG. 12 is a flow diagram representation of example operations related to maintaining a chunk filter for performing garbage collection of a candidate chunk based the chunk filter, in accordance with various aspects and implementations of the subject disclosure.

One or more aspects are represented in FIG. 12, and for example can be a system, comprising a processor, and a memory that stores executable instructions that, when executed by the processor, facilitate performance of operations. Example operations can comprise operation 1202, which represents maintaining a chunk filter in association with a tree data structure, comprising updating the tree data structure at array positions representing respective chunk identifiers of respective data chunks responsive to respective elements corresponding to the respective data chunks being added to the tree data structure. Operation 1204 represents verifying whether a data chunk garbage collection candidate is not in use, comprising hashing a chunk identifier of the data chunk garbage collection candidate to determine array positions corresponding to the chunk identifier in the chunk filter (operation 1206) and determining whether the data chunk garbage collection candidate is not in use or is possibly in use, comprising evaluating information stored in the array positions corresponding to the chunk identifier in the chunk filter (operation 1208).

Further operations can comprise, in response to the determining indicating that the data chunk garbage collection candidate is not in use, garbage collecting the data chunk garbage collection candidate, and in response to the determining indicating that the data chunk garbage collection candidate is possibly in use, scanning the tree data structure to determine whether the data chunk garbage collection candidate is in use or is not in use.

Scanning the tree data structure to determine whether the data chunk garbage collection candidate is in use or is not in use can determine that the data chunk garbage collection candidate is not in use, and further operations can comprise, garbage collecting the data chunk garbage collection candidate.

Further operations can comprise rebuilding the chunk filter into a new chunk filter during the scanning.

The chunk filter can comprise a Bloom filter. The data chunk garbage collection candidate can comprise a repository chunk.

The chunk filter can comprise a bitmap data structure, and hashing the chunk identifier can comprise using a group of hash functions to hash the chunk identifier into the array positions in the bitmap data structure. The chunk filter can comprise a bitmap data structure, and maintaining the chunk filter in association with the tree data structure can comprise updating the data structure at the array positions representing the respective chunk identifiers of the respective data chunks, which can comprise setting respective bits at respective array positions in the bitmap data structure.

Figure 13:
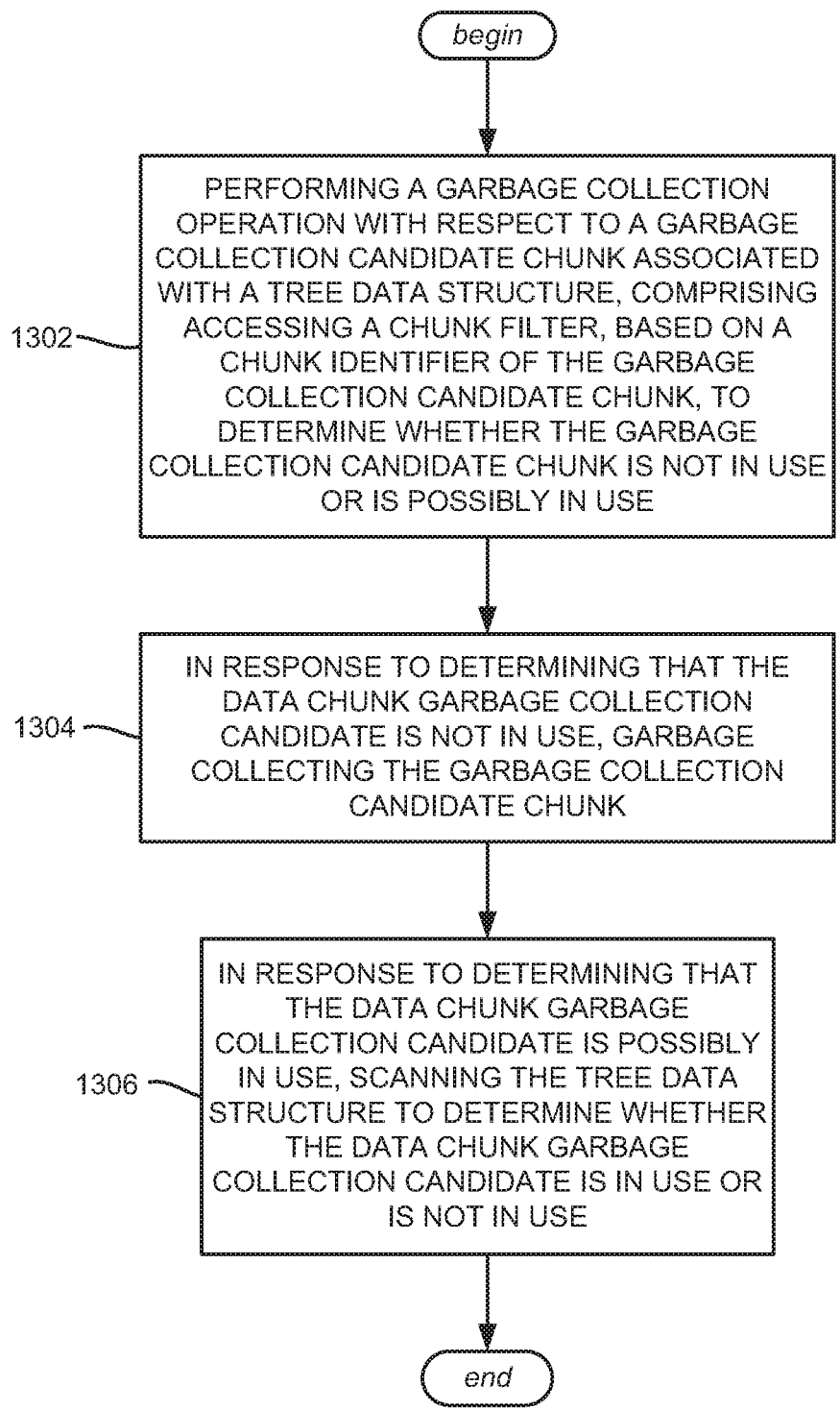
FIG. 13 is a flow diagram representation of example operations related to performing garbage collection, including using a chunk filter to evaluate whether a chunk is not in use, or is possibly in use whereby a corresponding tree needs to be scanned, in accordance with various aspects and implementations of the subject disclosure.

One or more aspects, such as implemented in a machine-readable storage medium, comprising executable instructions that, when executed by a processor, facilitate performance of operations, can be directed towards operations exemplified in FIG. 13. Operation 1302 represents performing a garbage collection operation with respect to a garbage collection candidate chunk associated with a tree data structure, comprising accessing a chunk filter, based on a chunk identifier of the garbage collection candidate chunk, to determine whether the garbage collection candidate chunk is not in use or is possibly in use. Operation 1304 represents, in response to determining that the data chunk garbage collection candidate is not in use, garbage collecting the garbage collection candidate chunk. Operation 1306 represents in response to determining that the data chunk garbage collection candidate is possibly in use, scanning the tree data structure to determine whether the data chunk garbage collection candidate is in use or is not in use.

Scanning the tree data structure can determine that the garbage collection candidate chunk is not in use, and further operations can comprise, garbage collecting the garbage collection candidate chunk.

Further operations can comprise rebuilding the chunk filter into a new chunk filter during the scanning.

Further operations can comprise maintaining the chunk filter in association with the tree data structure, which can comprise determining when an element corresponding to a data chunk is added to the tree data structure, hashing the chunk identifier of the data chunk to determine array positions in the chunk filter, and storing values at the array positions to indicate that the data chunk is in use.

As can be seen, described herein is a fast and safe way to use a chunk filter to verify whether a garbage collection candidate chunk is definitely not in use, in which event the garbage collection candidate chunk can be garbage collected without tree scanning. For a garbage collection candidate chunk that is indicated in one or more chunk filters as being possibly in use, tree scanning is performed to determine whether the garbage collection candidate chunk Is in use, or is not in use and can be garbage collected, but tree scanning only need be performed on the partition(s) with associated chunk filter(s) that indicate the garbage collection candidate chunk Is possibly in use.

Figure 14:
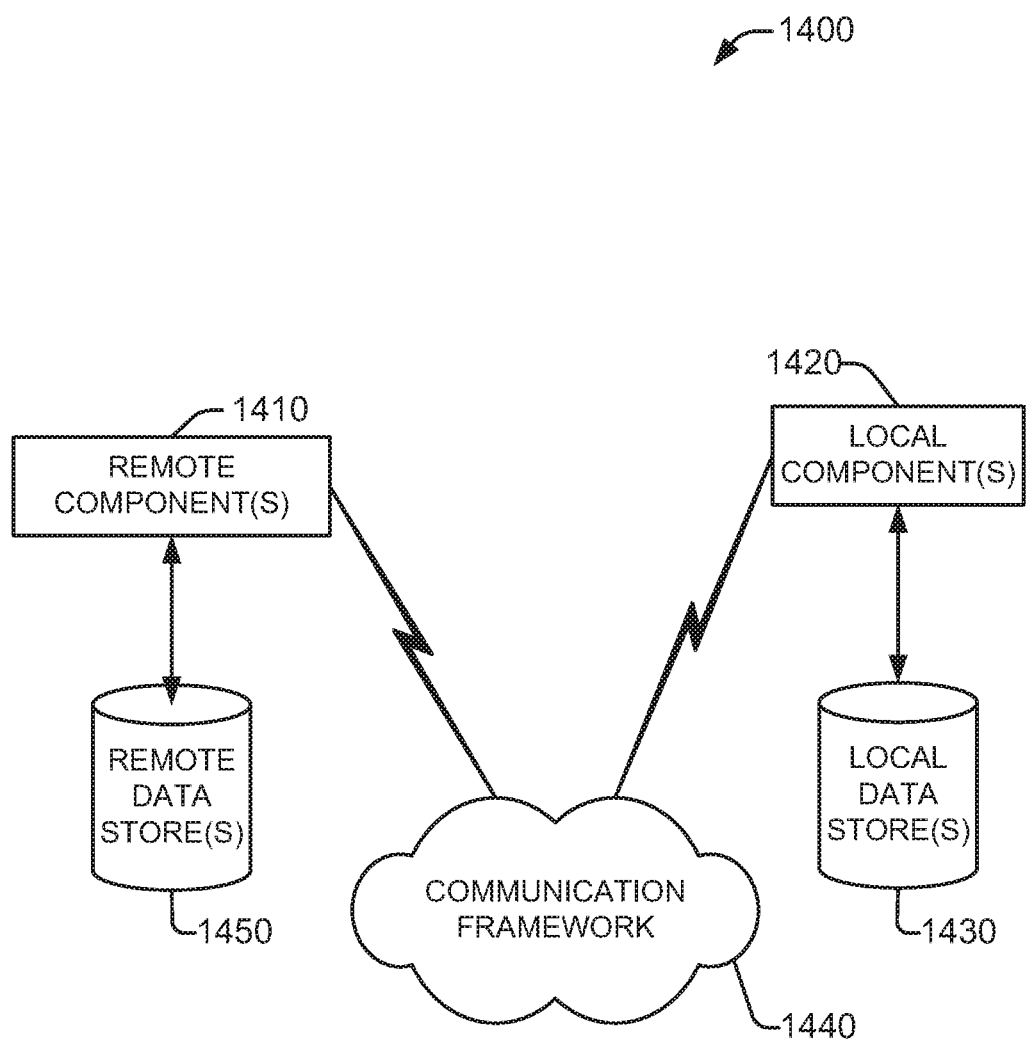
FIG. 14 depicts an example schematic block diagram of a computing environment with which the disclosed subject matter can interact, in accordance with various aspects and implementations of the subject disclosure.

FIG. 14 is a schematic block diagram of a computing environment 1400 with which the disclosed subject matter can interact. The system 1400 comprises one or more remote component(s) 1410. The remote component(s) 1410 can be hardware and/or software (e.g., threads, processes, computing devices). In some embodiments, remote component(s) 1410 can be a distributed computer system, connected to a local automatic scaling component and/or programs that use the resources of a distributed computer system, via communication framework 1440. Communication framework 1440 can comprise wired network devices, wireless network devices, mobile devices, wearable devices, radio access network devices, gateway devices, femtocell devices, servers, etc.

The system 1400 also comprises one or more local component(s) 1420. The local component(s) 1420 can be hardware and/or software (e.g., threads, processes, computing devices). In some embodiments, local component(s) 1420 can comprise an automatic scaling component and/or programs that communicate/use the remote resources 1410 and 1420, etc., connected to a remotely located distributed computing system via communication framework 1440.

One possible communication between a remote component(s) 1410 and a local component(s) 1420 can be in the form of a data packet adapted to be transmitted between two or more computer processes. Another possible communication between a remote component(s) 1410 and a local component(s) 1420 can be in the form of circuit-switched data adapted to be transmitted between two or more computer processes in radio time slots. The system 1400 comprises a communication framework 1440 that can be employed to facilitate communications between the remote component(s) 1410 and the local component(s) 1420, and can comprise an air interface, e.g., Uu interface of a UMTS network, via a long-term evolution (LTE) network, etc. Remote component(s) 1410 can be operably connected to one or more remote data store(s) 1450, such as a hard drive, solid state drive, SIM card, device memory, etc., that can be employed to store information on the remote component(s) 1410 side of communication framework 1440. Similarly, local component(s) 1420 can be operably connected to one or more local data store(s) 1430, that can be employed to store information on the local component(s) 1420 side of communication framework 1440.

Figure 15:
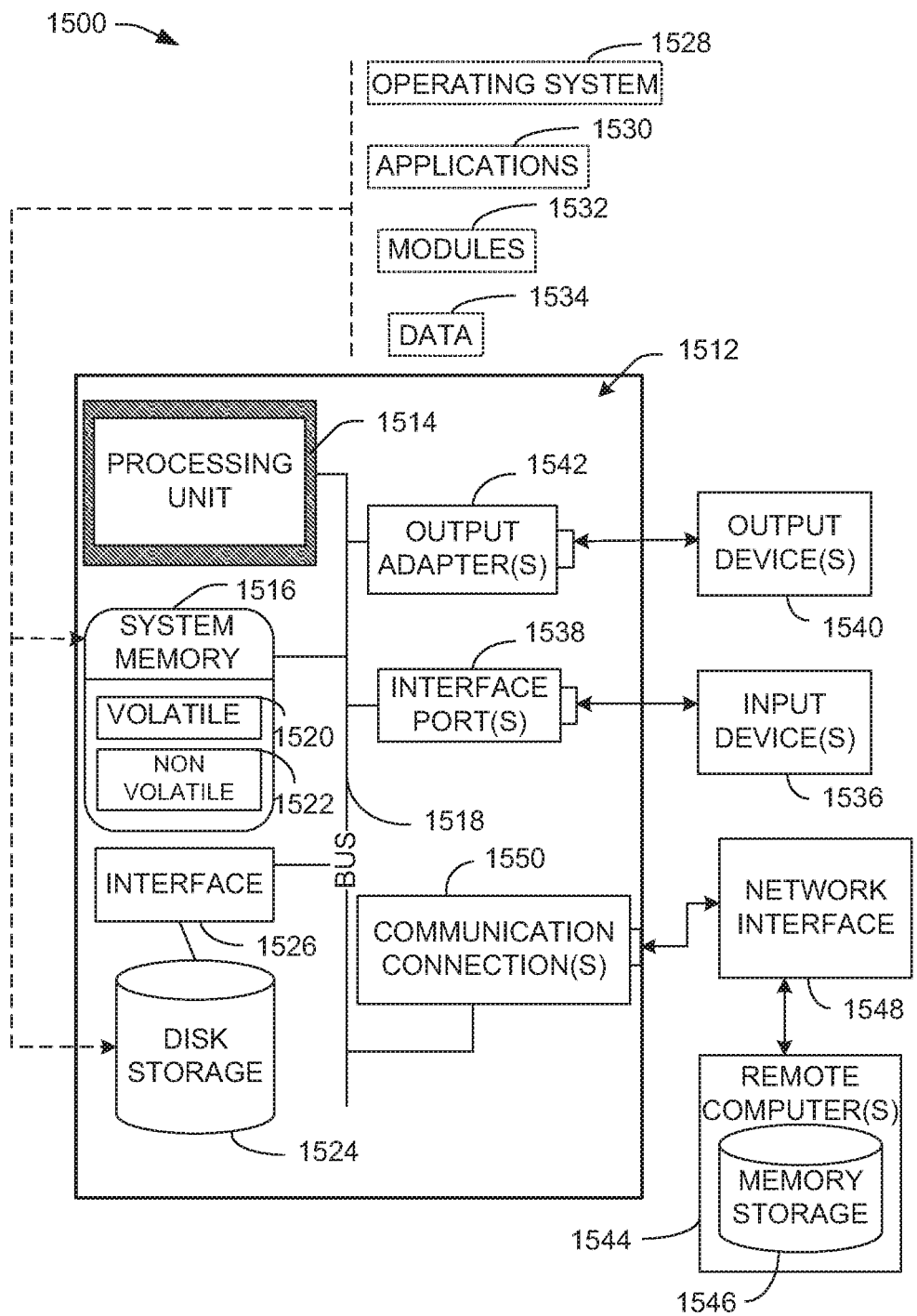
FIG. 15 illustrates an example block diagram of a computing system operable to execute the disclosed systems.

In order to provide a context for the various aspects of the disclosed subject matter, FIG. 15, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1520 (see below), nonvolatile memory 1522 (see below), disk storage 1524 (see below), and memory storage 1546 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 15 illustrates a block diagram of a computing system 1500 operable to execute the disclosed systems and methods in accordance with one or more embodiments/implementations described herein. Computer 1512, can comprise a processing unit 1514, a system memory 1516, and a system bus 1518. System bus 1518 couples system components comprising, but not limited to, system memory 1516 to processing unit 1514. Processing unit 1514 can be any of various available processors. Dual microprocessors and other multiprocessor architectures also can be employed as processing unit 1514.

System bus 1518 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1516 can comprise volatile memory 1520 and nonvolatile memory 1522. A basic input/output system, containing routines to transfer information between elements within computer 1512, such as during start-up, can be stored in nonvolatile memory 1522. By way of illustration, and not limitation, nonvolatile memory 1522 can comprise read only memory, programmable read only memory, electrically programmable read only memory, electrically erasable read only memory, or flash memory. Volatile memory 1520 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1512 can also comprise removable/non-removable, volatile/non-volatile computer storage media. FIG. 15 illustrates, for example, disk storage 1524. Disk storage 1524 comprises, but is not limited to, devices like a magnetic disk drive, floppy disk drive, tape drive, flash memory card, or memory stick. In addition, disk storage 1524 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1524 to system bus 1518, a removable or non-removable interface is typically used, such as interface 1526.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 15 describes software that acts as an intermediary between users and computer resources described in suitable operating environment 1500. Such software comprises an operating system 1528. Operating system 1528, which can be stored on disk storage 1524, acts to control and allocate resources of computer system 1512. System applications 1530 take advantage of the management of resources by operating system 1528 through program modules 1532 and program data 1534 stored either in system memory 1516 or on disk storage 1524. It is to be noted that the disclosed subject matter can be implemented with various operating systems or combinations of operating systems.

A user can enter commands or information into computer 1512 through input device(s) 1536. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1512. Input devices 1536 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1514 through system bus 1518 by way of interface port(s) 1538. Interface port(s) 1538 comprise, for example, a serial port, a parallel port, a game port, a universal serial bus, an infrared port, a Bluetooth port, an IP port, or a logical port associated with a wireless service, etc. Output device(s) 1540 use some of the same type of ports as input device(s) 1536.

Thus, for example, a universal serial busport can be used to provide input to computer 1512 and to output information from computer 1512 to an output device 1540. Output adapter 1542 is provided to illustrate that there are some output devices 1540 like monitors, speakers, and printers, among other output devices 1540, which use special adapters. Output adapters 1542 comprise, by way of illustration and not limitation, video and sound cards that provide means of connection between output device 1540 and system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. Remote computer(s) 1544 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1512. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1546 is illustrated with remote computer(s) 1544. Remote computer(s) 1544 is logically connected to computer 1512 through a network interface 1548 and then physically connected by way of communication connection 1550. Network interface 1548 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1550 refer(s) to hardware/software employed to connect network interface 1548 to bus 1518. While communication connection 1550 is shown for illustrative clarity inside computer 1512, it can also be external to computer 1512. The hardware/software for connection to network interface 1548 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
   obtaining, by a system comprising a processor, array positions in a chunk filter based on a chunk identifier of a data chunk, wherein the chunk filter is associated with a partition of a data storage system, and employs keys based on hashing chunk identifiers;
   determining, based on a key associated with the chunk identifier and values in the array positions in the chunk filter, whether the data chunk is not in use or is possibly in use;
   in response to the determining resulting in a first determination that the data chunk is not in use, garbage collecting the data chunk; and
   in response to the determining resulting in a second determination that the data chunk is possibly in use:
      performing a scanning operation on a tree data structure associated with the partition to verify whether the data chunk is in use or is not in use, wherein the tree data structure tracks locations of live user objects stored in data chunks of the partition, wherein the live user objects are currently referenced in the system,
      in response to the scanning operation resulting in a third determination that the data chunk comprises at least one live user object, determining that the data chunk is in use, and
      in response to the scanning operation resulting in a fourth determination that the data chunk does not comprise any live user objects:
         determining that the data chunk is not in use, and garbage collecting the data chunk.

2. The method of claim 1, further comprising maintaining the chunk filter in association with the tree data structure, comprising determining when an element corresponding to the data chunk is added to the tree data structure, hashing the chunk identifier of the data chunk to determine the array positions, and storing values at the array positions to indicate that the data chunk is in use.

3. The method of claim 2, wherein the chunk filter comprises a bitmap, and wherein the storing the values at the array positions to indicate that the data chunk is in use comprises setting respective bits at respective array positions.

4. The method of claim 1, wherein the data storage system comprises partitions having respective chunk filters.

5. The method of claim 1, further comprising rebuilding the chunk filter into a new chunk filter during the scanning operation.

6. The method of claim 5, wherein the chunk identifier is a first chunk identifier of a first data chunk, wherein the array positions are first array positions, and wherein the rebuilding the chunk filter further comprises detecting a tree data structure update corresponding to an element corresponding to a second data chunk being added to the tree data structure, in response to the detecting the tree data structure update, determining second array positions corresponding to a second chunk identifier of the second data chunk, and storing values at the second array positions to indicate that the second data chunk is in use in the new chunk filter.

7. The method of claim 1, wherein the obtaining the array positions comprises using a group of respective hash functions that hash the chunk identifier into the array positions.

8. The method of claim 1, wherein the chunk filter comprises a Bloom filter data structure comprising a corresponding bitmap data structure, and wherein the obtaining the array positions comprises using a group of respective hash functions that hash the chunk identifier into the array positions in the corresponding bitmap data structure.

9. A system, comprising:
   a processor; and
   a memory that stores executable instructions that, when executed by the processor, facilitate performance of operations, the operations comprising:
      maintaining a chunk filter in association with a tree data structure, comprising updating the chunk filter at array positions representing respective chunk identifiers of respective data chunks responsive to respective elements corresponding to the respective data chunks being added to the tree data structure, wherein the tree data structure is associated with a partition of a data storage system, and the chunk filter employs keys based on hashing chunk identifiers; and
      determining whether a data chunk garbage collection candidate is not in use or possibly in use, comprising:
         hashing a chunk identifier of the data chunk garbage collection candidate into a key to determine associated array positions corresponding to the chunk identifier in the chunk filter, and
         evaluating information stored in the associated array positions corresponding to the chunk identifier in the chunk filter;
      in response to the determining indicating that the data chunk garbage collection candidate is not in use, garbage collecting the data chunk garbage collection candidate; and
      in response to the determining indicating that the data chunk garbage collection candidate is possibly in use:
         performing a scanning operation on the tree data structure to verify whether the data chunk garbage collection candidate is in use or is not in use, wherein the tree data structure tracks locations of live objects stored in the respective data chunks of the partition, wherein the live objects are currently referenced in the system
         in response to the scanning operation resulting in a third determination that the data chunk garbage collection candidate comprises at least one live object, determining that the data chunk is in use, and
         in response to the scanning operation resulting in a fourth determination that the data chunk garbage collection candidate does not comprise any live objects:
            determining that the data chunk garbage collection candidate is not in use, and
            garbage collecting the data chunk garbage collection candidate.

10. The system of claim 9, wherein the maintaining the chunk filter comprises determining when an element corresponding to a data chunk is added to the tree data structure, hashing a corresponding chunk identifier of the data chunk to determine corresponding array positions, and storing values at the corresponding array positions to indicate that the data chunk is in use.

11. The system of claim 9, wherein the data storage system comprises partitions having respective chunk filters.

12. The system of claim 9, wherein the operations further comprise rebuilding the chunk filter into a new chunk filter during the scanning.

13. The system of claim 9, wherein the chunk filter comprises a Bloom filter.

14. The system of claim 9, wherein the data chunk garbage collection candidate comprises a repository chunk.

15. The system of claim 9, wherein the chunk filter comprises a bitmap data structure, and wherein the hashing the chunk identifier comprises using a group of hash functions to hash the chunk identifier into the array positions in the bitmap data structure.

16. The system of claim 9, wherein the chunk filter comprises a bitmap data structure, and wherein the maintaining the chunk filter in association with the tree data structure comprises updating the tree data structure at the array positions representing the respective chunk identifiers of the respective data chunks comprises setting respective bits at respective array positions in the bitmap data structure.

17. A non-transitory machine-readable medium, comprising executable instructions that, when executed by a processor, facilitate performance of operations, the operations comprising:

performing a garbage collection operation with respect to a garbage collection candidate chunk associated with a tree data structure, comprising accessing a chunk filter, based on a key associated with a chunk identifier of the garbage collection candidate chunk, to determine whether the garbage collection candidate chunk is not in use or is possibly in use, wherein the tree data structure is associated with a partition of a data storage system, and the chunk filter employs keys based on hashing chunk identifiers;

in response to determining that the garbage collection candidate chunk is not in use, garbage collecting the garbage collection candidate chunk; and in response to determining that the garbage collection candidate chunk is possibly in use:

scanning the tree data structure to verify whether the garbage collection candidate chunk is in use or is not in use, wherein the tree data structure tracks locations of currently referenced objects stored in chunks of the partition, in response to the scanning determining that the garbage collection candidate chunk comprises at least one currently referenced object, determining that the garbage collection candidate chunk is in use, and in response to the scanning determining that the garbage collection candidate chunk does not comprise any currently referenced objects:

determining that the garbage collection candidate chunk is not in user, and garbage collecting the garbage collection candidate chunk.

18. The non-transitory machine-readable medium of claim 17, wherein the data storage system comprises a group of partitions having respective chunk filters.

19. The non-transitory machine-readable medium of claim 17, wherein the operations further comprise rebuilding the chunk filter into a new chunk filter during the scanning.

20. The non-transitory machine-readable medium of claim 17, wherein the operations further comprise maintaining the chunk filter in association with the tree data structure, comprising determining that an element corresponding to a data chunk is added to the tree data structure, hashing the chunk identifier of the data chunk to determine array positions in the chunk filter, and storing values at the array positions to indicate that the data chunk is in use.

* * * * *